United States Patent [19]

Maraghe

[11] 4,447,026
[45] May 8, 1984

[54] CAM OPERATED COUNTERBALANCE ASSEMBLY FOR AIRCRAFT DOORS

[75] Inventor: Alex Maraghe, Seattle, Wash.

[73] Assignee: The Boeing Company, Seattle, Wash.

[21] Appl. No.: 474,651

[22] PCT Filed: Dec. 21, 1982

[86] PCT No.: PCT/US82/01782

§ 371 Date: Dec. 21, 1982

§ 102(e) Date: Dec. 21, 1982

[51] Int. Cl.³ .............................................. B64C 1/14
[52] U.S. Cl. .................................. 244/129.5; 16/313; 16/278; 49/386; 49/237
[58] Field of Search ........................ 244/129.5, 118.1; 49/236–245, 37, 386, 248; 16/303–309, 312–317, 277, 278, 371–374, 386, 284, 285, 282, 85

[56] References Cited

U.S. PATENT DOCUMENTS

| | | | |
|---|---|---|---|
| 2,604,653 | 7/1952 | Anderson et al. | 16/315 |
| 2,751,636 | 6/1956 | Heinemann et al. | 244/129.5 |
| 2,763,900 | 9/1956 | McAfee et al. | 49/248 |
| 3,051,280 | 8/1962 | Bergman et al. | 49/249 |
| 3,289,244 | 12/1966 | Carey | 16/315 |
| 3,401,422 | 9/1968 | Ventura . | |
| 3,791,073 | 2/1974 | Baker . | |
| 4,285,165 | 8/1981 | Persson | 49/238 |

FOREIGN PATENT DOCUMENTS

| | | | |
|---|---|---|---|
| 436908 | 6/1948 | Italy | 49/238 |
| 1551821 | 9/1979 | United Kingdom . | |

Primary Examiner—Galen L. Barefoot
Attorney, Agent, or Firm—Hughes, Barnard & Cassidy

[57] ABSTRACT

A compact, cam operated, counterbalance system (30) is provided for the torque tube assembly (25) associated with a moveable hinged structural member (20) of the type hingedly connected to a fixed structural member and adapted to pivot about an inclined hinge axis in which the counterbalance system includes: (i) a cylindrical cam (31) surrounding a torque tube (38) and defining an axially presented continuous cylindrical cam surface (32) formed by a plurality of axially presented curved ramps (32a, 32b); (ii) cam follower means (34, 35, 36) mounted concentrically about the torque tube (38); (iii) a compression spring (42) mounted concentrically about the torque tube (38) for continuously biasing one of the cylindrical cam (31) or the cam follower means (34, 35, 36) axially towards the other; (iv) one of the cylindrical cam (31) and the cam follower means (34, 35, 36) being rigidly mounted on the fixed structural member (22); (v) the other of the cylindrical cam (31) and the cam follower means (34, 35, 36) being non-rotatably mounted on the torque tube (38) with freedom for axial movement therealong under the forces exerted axially thereon by the compression spring (42); and (vi), wherein the cylindrical cam ramps (32a, 32b) are profiled such that the spring (42) is fully compressed axially when the movable structural member (20) is in a first position so that when the movable structural member (20) is shifted between first and second positions and the torque tube (38) is rotated about its axis so that the energy stored in the compression spring (42) when the movable structural member (20) is in the first position imparts a rotational torque to the torque tube (38) as the spring (42) is extended for reducing the amount of torque that must be manually applied when attempting to push the first structural member (20) upslope about the inclined hinge axis from the first to the second position and so that the spring (42) is compressed during movement of the movable structural member (20) from the second position to the first position.

22 Claims, 10 Drawing Figures

FIG. 6
FIG. 7
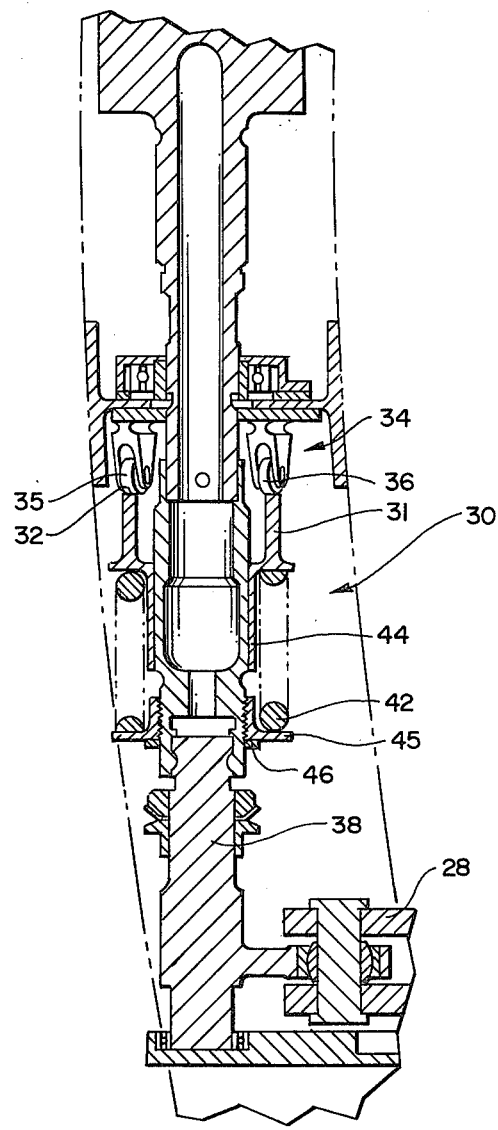
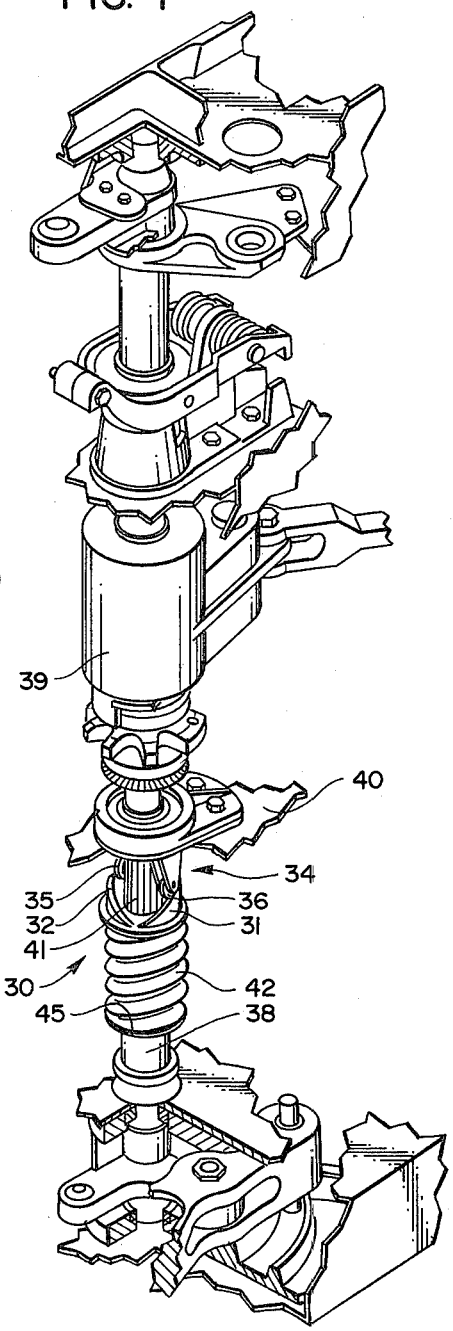

CAM OPERATED COUNTERBALANCE ASSEMBLY FOR AIRCRAFT DOORS

RELATED APPLICATIONS

Alex Maraghe and Allan William Opsahl, U.S. application Ser. No. 448,720, filed Dec. 10, 1982, for "Spring Operated Counterbalance Hinge Assembly for Aircraft Doors".

Karl G. Skotte, U.S. application Ser. No. 451,809, filed Dec. 21, 1982, for "Cantilever Spring Counterbalance Hinge Assembly For Aircraft Doors".

BACKGROUND OF THE INVENTION

1. Technical Field

The present invention relates generally to plug-type aircraft doors of the type adapted to swing through an arc approximating 180° about a generally vertical axis between a fully closed position flush with the aircraft fuselage and a fully opened position wherein the door is disposed in a plane essentially parallel to the aircraft fuselage centerline and with the door's outer skin surface in face-to-face relation with the outer skin surface of the fuselage; and, more particularly, to a simple, effective, compact and improved cam operated counterbalance hinge assembly for assisting on-board flight attendants who are required to manually open and close such doors—doors which today often weigh in excess of 300 pounds—and who, in the performance of their duties, must lift the relatively heavy door upwardly while simultaneously pushing outwardly to open the door and, similarly, must again lift the door upwardly while simultaneously pulling the door towards a closed position. Such movement of the door, which presents difficult and awkward problems for on-board flight attendants, is necessitated because the hinge axis for such doors must be inwardly canted from true vertical so that the operating components of the hinge assembly can be mounted within the curved configuration of the fuselage body structure.

2. Background Art

Conventional commercial aircraft are commonly provided with a multiplicity of ingress and egress openings in the aircraft fuselage with suitable doors being provided for closure of such openings. The doors vary widely in terms of their construction and operation. Commonly, such doors are plug-type doors which are designed to fit into the ingress/egress openings when the doors are closed so as to form a substantially smooth, continuous, uninterrupted, exterior skin surface. When such doors are opened, they are pivoted about the axis of a first torque tube assembly mounted in the door and moved slightly inboard, at which point the doors are pivoted simultaneously about the axes of both the first door-mounted torque tube assembly and a second torque tube assembly mounted in the fuselage body structure and to which the door is hingedly connected, with the door moving outwardly through the ingress/egress opening and swinging through an arc approximating 180° so that when fully opened, the door is entirely disposed outside of the aircraft fuselage, lying in a plane generally parallel to the aircraft centerline and with the door's outer skin surface essentially in face-to-face contact with the outer skin surface of the fuselage. In most instances today, such doors are manually operated by on-board flight attendants since most commercial aircraft carriers are reluctant to rely upon electrical actuating systems which are subject to electrical malfunction.

Moreover, as is well known to those skilled in the art, plug-type doors of the foregoing type, since they are required to conform in construction to the shape of the fuselage while providing access to the passenger compartment in the upper lobe of the aircraft, do not and cannot lie in a vertical plane either when fully closed or when fully opened; but, rather, they lie in a curvilinear plane having an inwardly canted chord line. As a consequence, the hinge assembly, including the fuselage mounted torque tube assembly, which must be entirely confined within the aircraft body structure, is inwardly canted from true vertical, often defining acute angles with the vertical of up to on the order of from 7° to 10°, or slightly more. This, of course, means that when the door is opened and pivoted through an arc about the generally vertical, inwardly canted hinge axis, the door must be initially pushed outwardly while it simultaneously moves upwardly; and, once it has moved through approximately two thirds of its permissible pivotal movement, the door begins to move downwardly toward the outer skin surface of the aircraft fuselage. Conversely, when the door is closed, it must be pulled upwardly and away from the aircraft fuselage; and, when it has transitted approximately one-third of its arcuate movement about the inwardly canted hinge axis, the door begins to move downwardly towards and into the ingress/egress opening in the fuselage, thus closing the same. As commercial aircraft get larger and larger, such doors similarly become larger; and, consequently, the doors, together with door mounted actuating systems and the requisite emergency evacuation equipment carried thereby, have become considerably heavier, often weighing on the order of 300 pounds or more.

Thus, when an on-board flight attendant attempts to open the door manually, he or she is, in effect, required to push the relatively heavy door uphill during the intial portion of door-opening movement until such time that the door reaches the highpoint in its path of travel, at which point the weight of the door tends to swing it more rapidly downhill towards the fully open position. Even more difficult for the on-board flight attendant is the problem of closing the door which now must be pulled upwardly and away from the fuselage by the attendant, who is standing inside the aircraft, until the door again reaches its highpoint during pivotal movement about the inwardly canted hinge axis, at which point the weight of the door serves to cause it to move rapidly in a downward and inward direction towards the ingress/egress opening.

The foregoing problem tends to be uniquely applicable to aircraft where the door's hinge axis must lie within, and conform to, the chord of the curved fuselage body structure and, consequently, the hinge axis must define an acute angle with the vertical. Cabinet doors, housing doors, and similar type doors, on the other hand, do not face this type of problem because such doors are generally hinged about a truly vertical axis, thereby permitting movement of the door through the entire range of movement without having to lift the weight of the door in an upward direction during any portion of door opening or closure. Nevertheless, such doors have commonly included spring-type assist mechanisms, which have generally been provided to insure that the door is biased to at least one of a fully closed and/or a fully opened position. For example, Jordan, U.S. Pat. No. 1,028,571 and Bales et al, U.S. Pat. No. 1,831,800 each disclose arrangements wherein a door (a vehicle door in Jordan and a cabinet door in Bales et al) will generally be in a neutral unbiased position when it is halfway opened, but which moves in either direction from that neutral half opened position as a consequence of the provision of spring mechanisms which serve to bias the door from the neutral position towards both a fully opened and a fully closed position.

In Van Dillen, U.S. Pat. No. 2,028,424, a swinging door closing device is illustrated which employs a casing mounted mechanism biased by a pair of oppositely wound clock springs such that swinging movement of the door in one direction or the other tends to wind a respective one of the two clock springs to establish a restoring moment tending to bias the door towards the closed position.

Lundine, U.S. Pat. No. 2,557,749, discloses a cantilever-type spring which is mounted on a cabinet structure and which has its free end in engagement with the door. The arrangement is such that when the door is pivoted from a closed position, the spring is deflected to create a restoring moment for automatically closing the door; but, when the door is fully opened, the spring includes a detent-like arrangement for capturing the door edge and holding the door in its fully opened position.

Other patents of general interest illustrating spring-type biasing arrangements for non-aircraft doors are those found in, for example: Chamberlain, U.S. Pat. No. 2,587,287; MacDonald, U.S. Pat. No. 3,205,532; Murphy et al, U.S. Pat. No. 3,918,755; and, Wheeler et al, U.S. Pat. No. 3,115,685; the latter two patents illustrating combined spring-like camming arrangements and cam follower rollers for attaining the desired biasing motion to move a door towards a fully closed and/or a fully opened position.

Insofar as aircraft are concerned, counterbalance systems have also been known; and, they tend to vary widely dependent upon the type of door involved. In, for example, a plug-type door of the type adapted to move inwardly and upwardly along tracks disposed on the interior of the aircraft, it is common to provide a counterbalance system including cables and pulleys for minimizing the amount of exertion required to raise the heavy door upwardly along its tracks. Similarly, in Moses, U.S. Pat. No. 4,086,726, a counterbalance system is provided for an aircraft door which is intended to swing about a horizontal axis in an outward and downward direction for providing a ramp or steps permitting access to the aircraft.

In recent years, large commercial aircraft have faced problems similar to the problem faced and resolved by the present invention. In those types of door counterbalancing systems, the particular aircraft body structure has provided sufficient room to accommodate a plurality of coil springs—generally three such springs—coaxially and in generally end-to-end relation about the torque tube carried within the fuselage body structure. One of such coil springs was generally wound in a direction to permit biasing of the door in one direction during the initial portion of either door opening or closing movement, while the remaining two springs served to provide the biasing forces required during the initial portion of movement in the opposite direction. However, with present day aircraft where the doors are characterized by their large size and weight and wherein the aircraft aerodynamic contour is such that the hinge axis defines a significant acute angle, the weight of the doors has required the use of increased bearing supports, and supplemental snubber mechanisms, and the like, which provide retarding forces when the door is moving in either direction in a downward path so as to protect the door, the fuselage and the actuating mechanisms from damage due to sudden jars or shocks. Because of such mechanisms, and the constrained nature of the space within the fuselage body structure, it has been found that there simply isn't sufficient space for such coil springs in surrounding relationship to the body mounted torque tube.

SUMMARY OF THE INVENTION

A compact, cam operated, two-way counterbalance system is provided for the hinge assembly of an inwardly/outwardly moveable aircraft passenger door of the type adapted to pivot about an inwardly canted hinge axis wherein the body-mounted torque tube assembly includes: (i) a cylindrical cam surrounding the body-mounted torque tube and defining an axially presented continuous cylindrical cam surface formed by a plurality of axially presented curved ramps; (ii) cam follower means mounted concentrically about the body-mounted torque tube; (iii) a compression spring mounted concentrically about the body-mounted torque tube for continuously biasing one of the cylindrical cam or the cam follower means axially towards the other; (iv) one of the cylindrical cam and the cam follower means being rigidly mounted on the aircraft body structure; (v) the other of the cylindrical cam and the cam follower means being nonrotatably mounted on the torque tube with freedom for axial movement therealong under the forces exerted axially thereon by the compression spring; and (vi), wherein the cylindrical cam ramps are profiled such that the spring is fully compressed axially when the aircraft door is fully closed and fully opened, and so that when the door is shifted between fully closed and fully opened positions and the body-mounted torque tube assembly is rotated about its axis, the one of the cylindrical cam and the cam follower means nonrotatably mounted on the torque tube rotates therewith with the compression spring being alternately compressed and extended in an axial direction as the cam follower means traverse the ramps on the cylindrical cam with axial extension of the spring being coincident with at least a substantial portion of upslope movement of the door about the inwardly canted hinge axis during both opening and closing of the door so that the energy stored in the compression spring when the door is fully closed and fully opened imparts a rotational torque to the torque tube as the spring is extended for reducing the amount of torque that must be manually applied by an on-board flight attendant when attempting to push the door upslope during a door opening operation and when attempting to pull the door upslope during a door closing operation.

In the exemplary form of the invention here described, this is achieved by rigidly securing a spring retaining cap to the body-mounted torque tube for rotation therewith, concentrically mounting a compression spring about the torque tube with one end of the spring being bottomed on the retainer cap, and mounting an internally splined cylindrical cam on an externally splined portion of the torque tube with the base of the cylindrical cam being bottomed on the free end of the compression spring and with the axially presented ramp surfaces on the cam facing away from the spring and being engaged by roller-type cam followers which are supported on a bracket mounted concentrically about the torque tube and rigidly secured to the aircraft body structure. In the illustrative form of the invention, two such roller-type cam followers are provided which are positioned 180° apart on opposite sides of the torque tube and oriented with respect to the ramp-like profile on the cylindrical cam such that the followers engage the highpoints of the cylindrical cam when the door is fully closed and are only slightly offset from the highpoints of the cylindrical cam when the door is fully opened, thereby insuring that when the door is shifted between opened and closed positions, the cam followers traverse the downhill portions of the ramp-like cam surfaces while the door is moving upslope so as to permit the compressed spring to be extended and impart rotational torque to the torque tube, and with the cam followers traversing the upslopes on the ramp-like cam surfaces when the door is moving in a downslope direction for the purpose of compressing the spring in an axial direction and storing energy therein.

Accordingly, it is a general aim of the present invention to provide a simple, compact, lightweight, yet highly effective cam operated counterbalance mechanism which is capable of minimizing the exertion required by on-board flight attendants in opening and closing plug-type doors on aircraft, yet which does not occupy a significant amount of space within the aircraft body structure and which readily permits the incorporation of necessary auxiliary equipment of the type commonly associated with the hinge mechanisms for such doors.

DESCRIPTION OF THE DRAWINGS

These and other objects and advantages of the present invention will become more readily apparent upon reading the following detailed description and upon reference to the attached drawings, in which:

FIG. 6 is a sectional view taken substantially along the line 6—6 in FIG. 5, here illustrating details of the body-mounted torque tube assembly;

FIG. 7 is a fragmentary perspective view illustrating details of the body-mounted torque tube assembly and counterbalance mechanism of the present invention;

Figure 1:
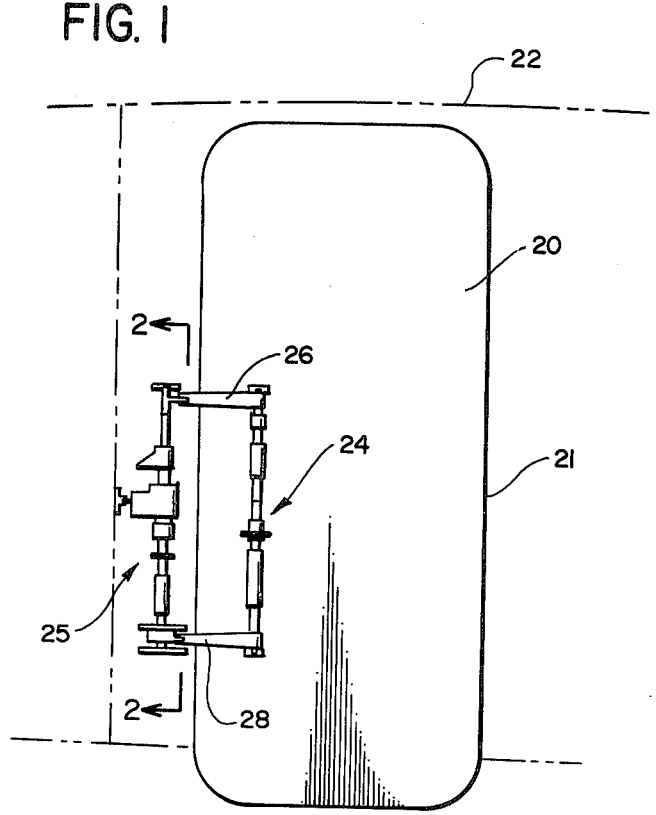
FIG. 1 is an external, highly diagrammatic, fragmentary side elevational view of a portion of a conventional large capacity passenger aircraft fuselage, shown in phantom lines, and depicting in solid lines the location of a conventional passenger plug-type ingress/egress door of the type adapted to move inwardly and outwardly during door closing and opening movements, respectively, and also depicting in solid line diagrammatic form the relative locations of the fuselage, or body-mounted, and the door-mounted torque tube assemblies which form part of a conventional door hinge assembly.

While the invention is susceptible of various modifications and alternative forms, a specific embodiment thereof has been shown by way of example in the drawings and will herein be described in detail. It should be understood, however, that it is not intended to limit the invention to the particular form disclosed but, on the contrary, the intention is to cover all modifications, equivalents and alternatives falling within the spirit and scope of the invention as expressed in the appended claims.

DETAILED DESCRIPTION

Environment Of The Invention

Figure 2:
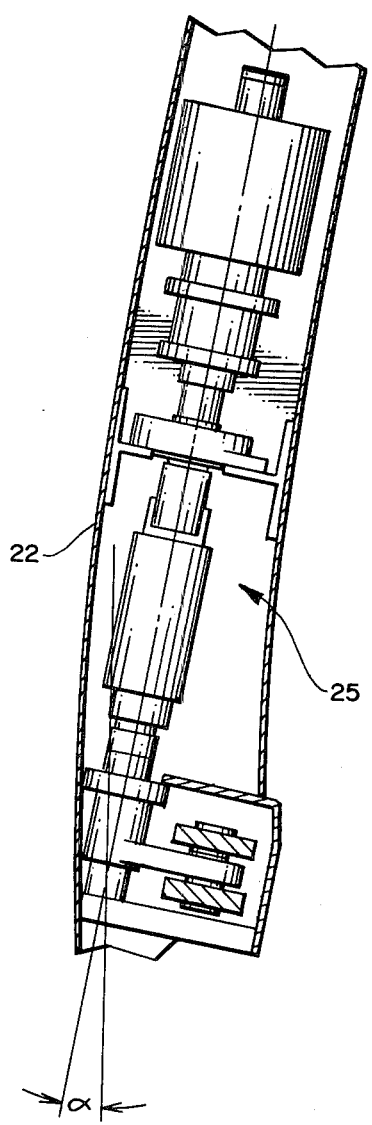
FIG. 2 is a diagrammatic sectional view taken substantially along the line 2—2 in FIG. 1 here illustrating the contour of the aircraft fuselage at the passenger ingress/egress door location wherein such contour mandates that the torque tube/hinge assembly be canted inwardly—i.e., that it be oriented at an acute angle to the vertical—thus necessitating upward movement of the door about the inclined hinge line during the initial portion of both door opening movement and door closing movement.
Figure 3:
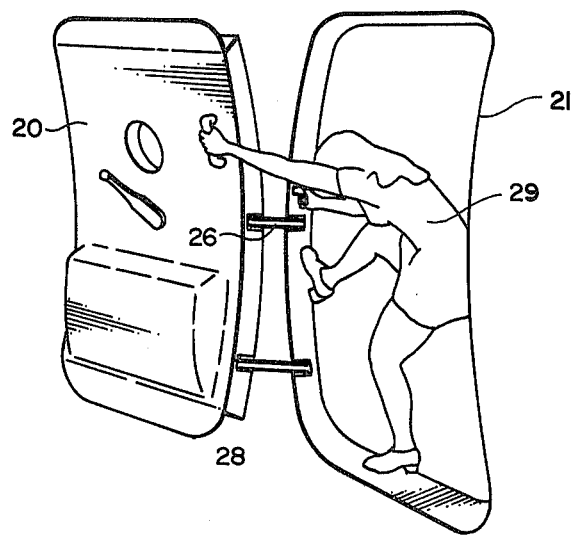
FIG. 3 is a fragmentary perspective view here depicting an on-board aircraft attendant attempting to initiate closing movement of a fully opened aircraft passenger door.

Turning first to FIGS. 1 and 2, conjointly, there has been illustrated in simplified diagrammatic form a typical aircraft plug-type door 20 of the type adapted to be swung inwardly and outwardly of the aircraft about a generally vertical axis for closing and opening an ingress/egress opening 21 formed in the fuselage 22 of the aircraft. As here illustrated, the exemplary construction includes a first door-mounted torque tube assembly, generally indicated at 24 in FIG. 1, and a second torque tube assembly, generally indicated at 25 in FIGS. 1 and 2, mounted in stationary bearings integrally secured to the fuselage 22 body structure, with the two torque tube assemblies being interconnected by upper and lower hinge arms 26, 28, respectively. As is evident upon inspection of FIG. 2, the curved nature of the aircraft fuselage 22 in the region of the ingress/egress opening 21 (FIG. 1) disposed in the upper lobe passenger compartment is such that both torque tube assemblies but, especially the body-mounted torque tube assembly 25, must be inwardly canted, defining an acute angle $\alpha$ with the vertical. Moreover, as will be apparent to those skilled in the art, the exemplary plug-type door 20 of the type here shown is conventionally designed to be opened by unlocking the door and rotating the door about the axis of the door-mounted torque tube assembly 24, so as to move the door inwardly into the passenger compartment from a fully closed and sealed position, at which point the door is rotated simultaneously about the axes of both the door-mounted torque tube assembly 24 and the body-mounted torque tube assembly 25 with the door moving outwardly through the ingress/egress opening 21 and swinging in an arc approximating 180°—here, the arc is actually about 173°—about the hinge axis. Because the hinge axis is inwardly canted defining an acute angle $\alpha$ which is on the order of approximately 10°, as the door rotates it must move along an uphill slope during at least a portion of both its opening travel and its closing travel. In practice, during opening of the door, it tends to move in an upward and outward direction during the initial portion of motion through an arc approximating 123°; and, thereafter, it moves along a downward slope about the inwardly canted hinge axis through an arc of about 50° until it lies in the fully open position shown in FIG. 3. Thus, during closing movement, the on-board flight attendant 29 is required to grasp the door 20, which will generally weigh on the order of 300 pounds or more, and move it simultaneously outwardly away from the fuselage and upwardly along an inclined slope through an arc approximating 50°, at which point the door begins to move towards the ingress/egress opening 21 along a downward slope. Unfortunately, the on-board location of the flight attendant makes such door movement extremely difficult because of the exceedingly poor leverage that he or she is able to apply.

Figure 4:
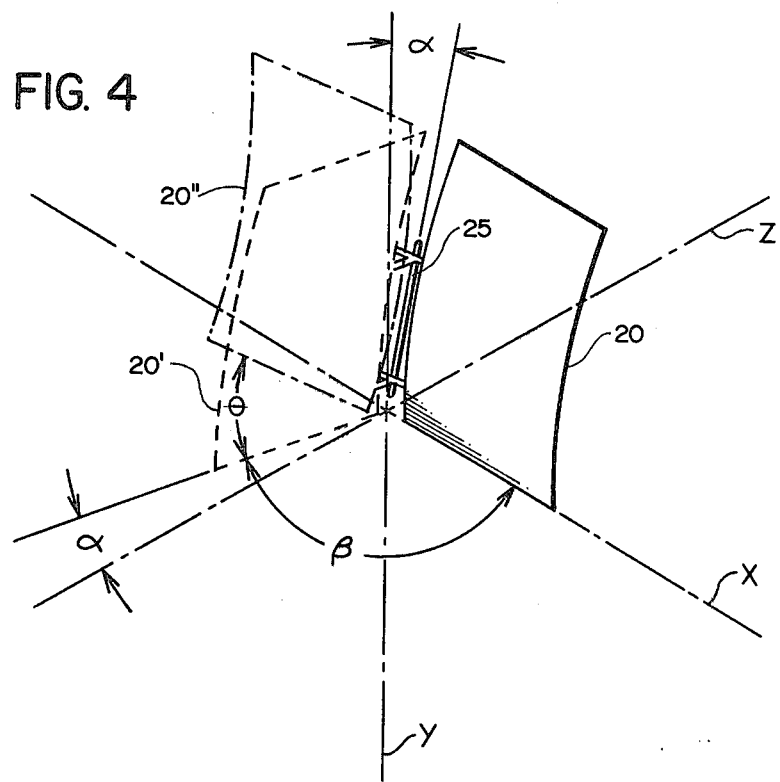
FIG. 4 is a diagrammatic perspective line drawing illustrative of the movement of a structural element— for example, an aircraft passenger door—about a simple canted or non-vertical hinge axis, and in XYZ coordinate space, between fully closed, partially closed or opened, and fully opened positions, respectively illustrated in solid lines, broken lines and dash-dot lines.

The foregoing problem may be more easily understood by reference to the diagrammatic line drawing set forth in FIG. 4 wherein a structural member such as an aircraft door 20 has been illustrated in solid lines in the fully closed position, in broken lines in the partially open position shown at 20', and in dash-dot lines in the fully open position shown at 20", with the door being adapted for movement in XYZ coordinate space about the axis of a simple torque tube assembly 25 disposed at an acute angle $\alpha$ on the order of 10° with the vertical axis Y. Thus, when the door is moved from the closed position indicated at 20 to the partially open position indicated at 20', it must be moved through the angle of rotation $\beta$; and, during that portion of door movement about the inwardly canted axis of the torque tube assembly 25, the door moves uphill so that its bottom edge defines an acute angle $\alpha$ with the XZ plane. Continued opening movement of the door from the position 20' to the fully opened position 20" requires movement of the door through an angle of rotation $\theta$ until such time as it is fully opened, at which point its bottom edge is again generally parallel to the XZ plane. Conversely, when the door is moved from the fully open position indicated at 20" to the fully closed position indicated at 20, it first moves in an uphill direction through the angle of rotation $\theta$; and, thereafter, the door moves downwardly through the angle of rotation $\beta$ until fully closed. During downward movement of the door through the angle $\beta$ in closing and the angle $\theta$ in opening, the weight of the door tends to aid in door movement; but, during upward movement of the door through the angle $\beta$ when the door is opening and through the angle $\theta$ when the door is closing, the weight of the door functions to resist the forces applied by the attendant to move the door. Accordingly, the present invention is concerned with a counterbalance mechanism that tends to minimize or counterbalance the resistance forces created by the weight of the door as the on-board flight attendant moves the door through its upward paths of movement in both a door opening and a door closing mode of operation.

Counterbalance Mechanism Embodying The Present Invention

In accordance with the important aspects of the present invention, and as best illustrated by reference to FIGS. 5 through 8 conjointly, a simple, highly effective, compact, cam operated counterbalance mechanism, generally indicated at 30 in the drawings, is provided for establishing a negative hinge moment which counteracts the positive hinge moment attributable to the weight of the door 20 during movement of the door along uphill slopes as the door rotates about the inwardly canted hinge axis during both door opening and door closing movement. To this end, there has been provided a cylindrical cam 31 defining an axially presented ramp-like cam face 32 cooperable with cam follower means, generally indicated at 34, defined by a pair of cam rollers 35, 36; and, wherein the cylindrical cam 31 and cam follower means 34 are mounted in coaxial facing relationship about the torque tube 38 associated with the body-mounted torque tube assembly 25. The torque tube assembly 25 further includes a conventional snubber mechanism 39 which functions in a manner well known to those skilled in the art to retard and brake the door 20 as it moves through its downwardly sloped paths of movement during both door opening and door closing movement.

In carrying out the present invention, the exemplary counterbalance mechanism 30 here disclosed by way of example includes cam follower means 34 which are fixedly secured to the aircraft body structure 22 by means of a bracket 40; while the cylindrical cam 31 is nonrotatably mounted on the torque tube 38 with freedom for limited axial movement therealong by means of a splined connection 41. As here shown, the cylindrical cam 31 is biased into engagement with the cam follower means 34 by means of a compression spring 42 which is coaxially mounted about the torque tube 38 and a cylindrical sleeve 44 integral with cam 31, with the lower end of spring 42 being bottomed on a retainer cap 45 which is threadably engaged with, and carried by, torque tube 38 and fixedly secured in place by suitable conventional locking means 46 which may simply take the form of a retainer spring or the like. Thus, in the illustrative form of the invention, spring 42 serves to bias the axially movable cylindrical cam 31 (which is nonrotatably splined to the torque tube 38 for simultaneous rotation therewith) in an axial direction towards and into engagement with the cam rollers 35, 36 which are fixedly secured to the aircraft body structure 22 by means of bracket 40. However, those skilled in the art will appreciate that it is within the scope of the invention to interchange the positions of the cam follower means 34 and the cylindrical cam 31. That is to say, it is equally possible to fixedly mount the cylindrical cam 31 on bracket 40 and to mount the cam follower means 34 on the torque tube 38 employing a nonrotatable splined connection and suitable spring means for biasing the cam followers in an axial direction into engagement with the cam.

Figure 5:
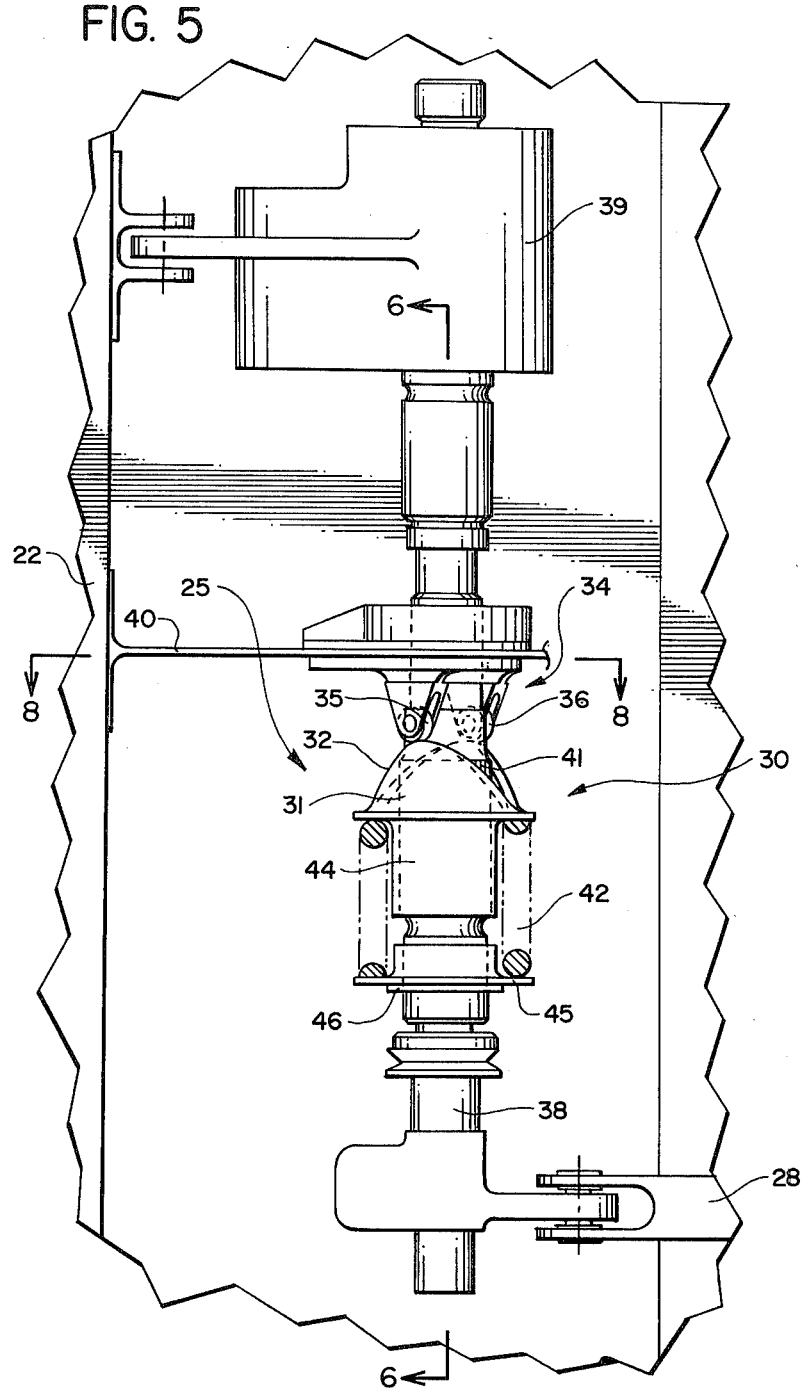
FIG. 5 is a fragmentary side elevational view, partially in section and with parts removed for purposes of clarity, here illustrating a portion of the aircraft passenger door hinge assembly including particularly the fuselage or body-mounted torque tube assembly and a counterbalance mechanism embodying features of the present invention for minimizing the amount of manual exertion required to open a fully closed door and close a fully opened door.
Figure 8:
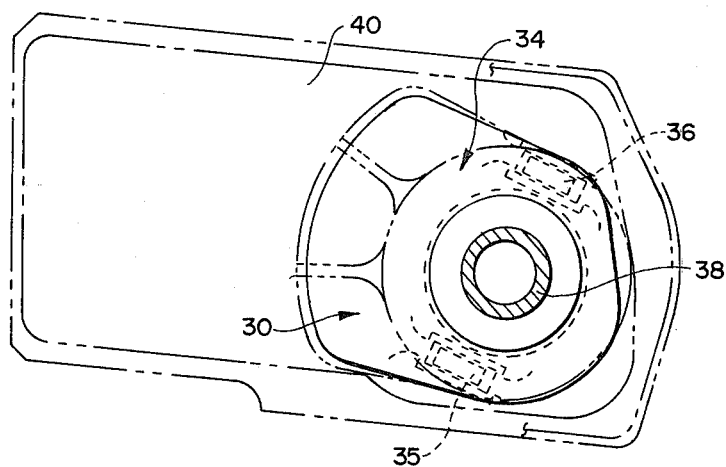
FIG. 8 is a sectional view, taken substantially along the line 8—8 in FIG. 5, and depicting details of the counterbalance mechanism of the present invention.

As indicated in FIG. 5, it will be noted that the cam rollers 35, 36 are engaged with the axially presented ramp-like face 32 of cylindrical cam 31 at the highpoints of the cam profile, a position wherein the spring 42 is fully compressed and generally corresponding to the position of the counterbalance mechanism 30 when the door 20 is either fully closed or fully open. That is, when the door is fully opened or fully closed, the spring 42 is fully compressed and functions as a stored energy device which is tending to bias cam 31 in an axial direction (upward as viewed in the drawings). As best illustrated by reference to FIGS. 5, 8 and 9 conjointly, when the on-board flight attendant desires, for example, to open a fully closed door 20, he or she will unlock the door and begin to pivot it about its inwardly canted hinge axis in a completely conventional manner. As the door 20 begins to pivot about the axis of the inwardly canted body-mounted torque tube assembly 25, torque tube 38 will begin to rotate (in a clockwise direction as viewed in FIG. 8); and, consequently, as the torque tube 38 rotates, the cylindrical cam 31 which is nonrotatably splined thereto begins to rotate with it and the cam rollers 35, 36 commence riding in a downslope direction along the portions 32a of the ramp-like face 32 on cylindrical cam 31, as indicated by the broken line positions 35a, 36a for the rollers in FIG. 9. Since the rollers 35, 36 are fixedly mounted on bracket 40 and are, therefore, precluded from either axial or rotational movement relative to the clockwise rotating torque tube 38, spring 42 begins to expand so as to maintain the cam 31 and cam follower means 34 in face-to-face engagement; and, as the spring 42 is extended axially while the cam rollers 35, 36 transit the portions 32a of the ramp-like face of cam 31 in a downslope direction, the energy stored therein imparts rotational torque in a clockwise direction to the torque tube 38, thereby minimizing the amount of force that the on-board flight attendant must manually provide in order to push the door 20 outwardly and upwardly through the angle of rotation β (FIG. 4) as the door moves in an upslope direction about the inwardly canted hinge axis during the initial portion of door opening.

Figure 9:
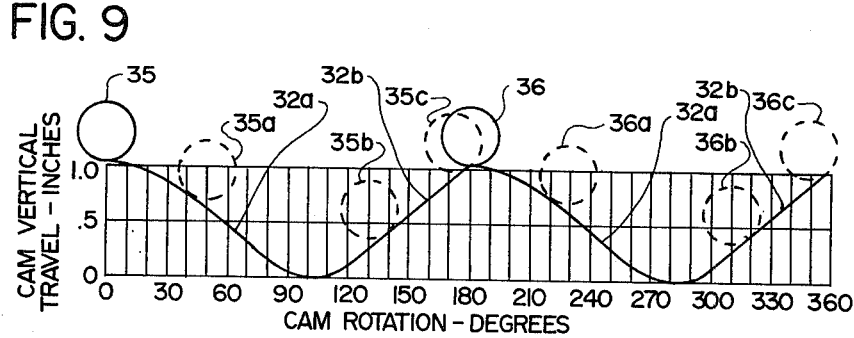
FIG. 9 is a diagramatic elevational view of the cam arrangement employed in the counterbalance mechanism of the present invention, but with the cylindrical cam here being depicted in flat, pattern-like profile form for purposes of facilitating and understanding of the invention, and illustrating the position of the two cam followers or rollers in solid lines when the door is fully closed and in phantom lines at various positions of the aircraft passenger door ranging from the fully closed position to the fully opened position; and, FIG. 10 is a graphic representation of the forces required to open and close the aircraft passenger door when manufactured in accordance with the present invention illustrating the angular position of the door in degrees (0° representative of a fully closed door and approximately 173° representative of a fully opened door) along the abscissa, and hinge moment—i.e., the requisite force to move the door—in inch/pounds along the ordinate.

As the door 20 reaches the highpoint in its opening movement and moves through the angle of rotation θ (FIG. 4) in a downslope direction, the rollers 35, 36 associated with the cam follower means 34 transit the portions 32b of the ramp like face 32 on cam 31 in an upslope direction as indicated at 35b, 36b in FIG. 9, ultimately arriving at points 35c, 36c adjacent to the highpoints of the cylindrical cam 31 when the aircraft door 20 is fully open. Thus, in this position, the spring 42 is again fully compressed and functions as a stored energy device for imparting counterclockwise rotational torque to the torque tube 38 when the on-board flight attendant is ready to reclose the fully open door. During reclosing of the door, the body-mounted torque tube 38 is rotated in a counterclockwise direction as viewed in FIG. 8; and, during such rotation, the cam rollers 35, 36 again transit the faces 32b (FIG. 9) of the cam 31, this time in a downslope direction, passing through the positions indicated at 35b, 36b during which period of time the door is moving through the rotational angle θ (FIG. 4) in an upslope direction. As the door passes its highpoint in its rotational swing about the inwardly canted hinge axis and commences its downslope travel through the angle of rotation β towards a fully closed position, the cam rollers 35, 36 traverse the faces 32a of the cam 21 in an upslope direction so as to again compress spring 42 and store energy therein.

Figure 10:
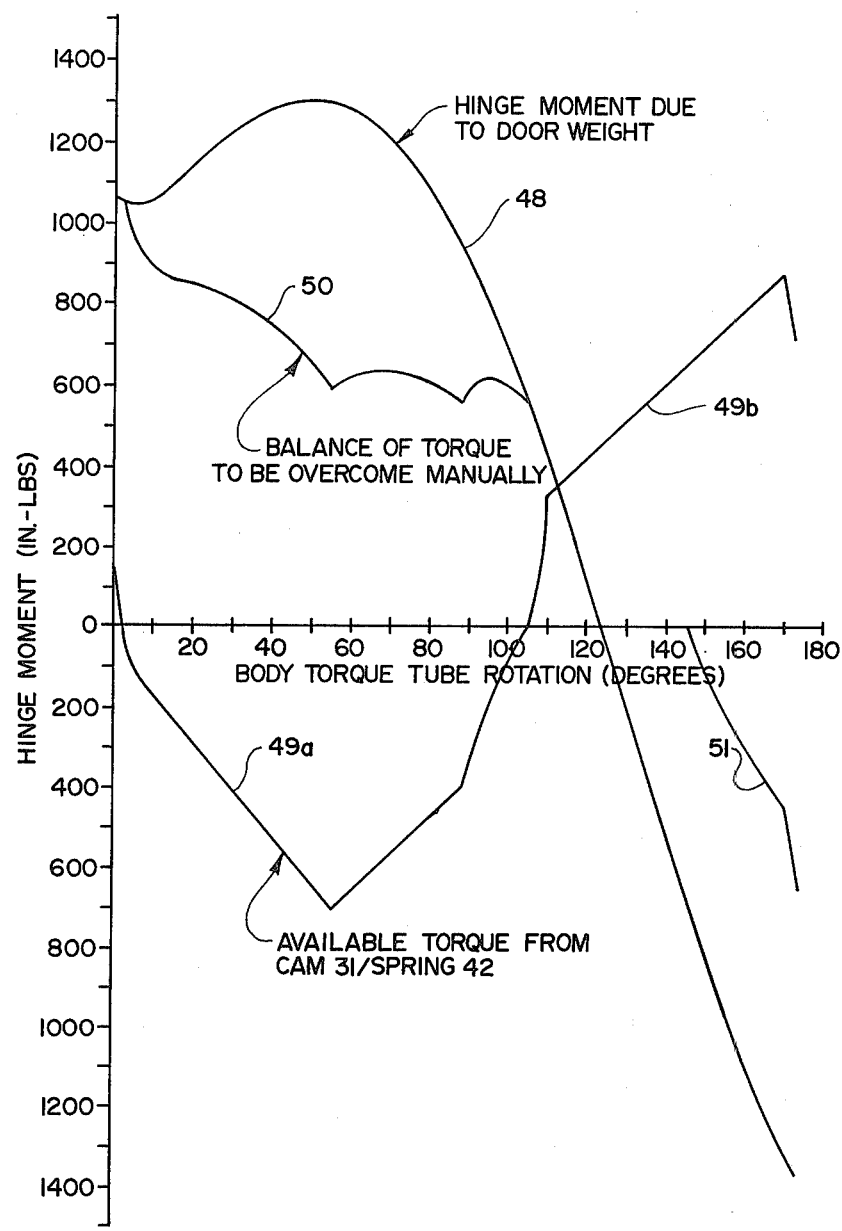

Referring next to FIG. 10, the advantages attained by the present invention will become more readily understandable. Thus, as here shown, it will be noted that the hinge moment attributable to the weight of the door 20 is represented by the curve 48. Considering the force required to overcome hinge moment during door opening movement, it will be noted that approximately 1,070 in./lbs. are initially required to initiate movement of the door 20 from a fully closed position; and, as the door progressively moves through an angle of rotation β (FIG. 4), of approximately 123°, the amount of force required gradually increases throughout the first 40° to 45° of the door movement and then progressively decreases, reaching 0 in./lbs. when the door 20 reaches its highpoint—i.e., a point where the angle β (FIG. 4) is approximately 123°—at which point the door commences downward movement and the weight of the door itself provides the force necessary to fully open the door. At the same time, however, the cylindrical cam 31 and spring 42 provide an increasing negative torque ranging from about +150 in./lbs. when the door is fully closed to about −700 in./lbs. when the door has swung through a rotational angle of approximately 55°. Thereafter, the cam 31 and spring 42 provide a decreasing negative torque, reaching 0 in./lbs. when the door has rotated through an angle of approximately 105°, as indicated by the curve 49a. As a consequence, during door opening the resultant torque which must be overcome manually by the on-board flight attendant is substantially reduced from the hinge moment attributable to door weight as represented by the curve 48 to the resultant curve indicated at 50. Similarly, during door closing movement, the cam 31 and spring 42 provide torque represented by the curve 49b as the door moves from a fully opened position back towards its highpoint, thus substantially reducing the amount of manually applied torque that must be imparted by the on-board attendant as indicated by the resultant curve 51.

It has been found in the practice of the invention that during the period when the door is moving through a rotational angle ranging from about 105° to about 143° (as measured from the fully closed door position) the counterbalance mechanism 30 of the present invention is basically idling; and, during this portion of door movement, the counterbalance mechanism has little, if any, effect. Similarly, during approximately the first 35° of door opening movement, it has been found that the on-board flight attendant is so positioned that excellent manually exerted leverage is available and, consequently, no significant counterbalancing effect is either required or attained. However, when the door is being opened and is moving from a partially opened position where the angle β is approximately 35° until a position where the angle β is approximately 105°, the counterbalance mechanism of the present invention significantly reduces the amount of manual exertion required. Similarly, during the initial angle θ of approximately 30° when the on-board flight attendant is attempting to initiate movement of the door from a fully opened position towards a fully closed position, the maximum counterbalancing effect is achieved; and, thereafter, the attendant requires little, if any, assistance.

Thus, those skilled in the art will appreciate that there has herein been described a simple, extremely compact, and exceedingly effective spring biased cam operated counterbalance system which minimizes the torque that must be imparted to the door by the on-board flight attendant during those portions of door opening and closing movement when the door is moving uphill. It will, of course, be understood that the particular cam profile selected may vary widely dependent upon such variables as the weight of the door, the angle through which it rotates, the location of its highpoint as it swings about an inwardly canted hinge axis, etc.; provided only that the cam 31 functions to compress the spring 42 during those portions of door downslope movement where it is desired to impart counterbalancing torque as the door is pushed and/or pulled along an upslope path.

What is claimed is:

1. Apparatus for reducing the torque required to manually rotate a movable structural member about a canted hinge axis comprising, in combination:
   (a) a fixed structural member;
   (b) a torque tube mounted on said fixed structural member, said torque tube lying in a plane defining an acute included angle $\alpha$ with the vertical and defining an inclined hinge axis;
   (c) a movable structural member;
   (d) hinge means for coupling said movable structural member to said torque tube for permitting rotation of said movable structural member and said torque tube about said inclined hinge axis with said movable structural member rotating between first and second positions and wherein said movable structural member is constrained for movement in an upslope direction about said inclined hinge axis during at least a portion of rotation thereof from said first to said second position and for movement in a downslope direction during at least a portion of rotation thereof from said second to said first position;
   (e) cylindrical cam means mounted concentrically about said torque tube and co-axial therewith, said cylindrical cam means defining an axially presented cylindrical ramp-like cam face;
   (f) cam follower means mounted concentrically about said torque tube and co-axial therewith; said cam follower means including a plurality of cam rollers engaged with said cylindrical ramp-like cam face;
   (g) one of said cylindrical cam means and said cam follower means being fixedly mounted on said fixed structural member;
   (h) the other of said cylindrical cam means and said cam follower means being nonrotatably mounted on said torque tube with freedom for axial movement therealong;
   (i) axially compressible and expandable spring means mounted concentrically about said torque tube and having one end thereof restrained from axial movement relative to said torque tube and the other end thereof bottomed on said other of said cylindrical cam means and said cam follower means for normally biasing said other of said cylindrical cam means and said cam follower means into engagement with said one of said cylindrical cam means and said cam follower means; and,
   (j) said cylindrical cam means being profiled so that said spring means is fully compressed when said movable structural member is in said first position so that when said movable structural member is rotated from said first position towards said second position about said inclined hinge axis, said spring means is permitted to expand axially as said movable structural member moves in an upslope direction and said torque tube rotates to cause said cam follower means to relatively traverse said ramp-like cam face whereby the other of said cylindrical cam means and said cam follower means imparts rotational torque to said torque tube as said spring means expands axially to thereby reduce the manual exertion required to rotate said movable structural member in an upslope direction about said inclined hinge axis during movement thereof from said first position to said second position.

2. Apparatus as set forth in claim 1 wherein said cam follower means is fixedly mounted on said fixed structural member and said cylindrical cam means is nonrotatably mounted on said torque tube with freedom for axial movement relative thereto.

3. Apparatus as set forth in claims 1 or 2 wherein said fixed structural member comprises wall defining means and said movable structural member comprises a door hingedly connected thereto for movement about said inclined hinge axis.

4. Apparatus as set forth in claims 1 or 2 wherein said cam follower means includes two cam rollers disposed on diametrically opposite sides of said torque tube.

5. Apparatus as set forth in claims 1 or 2 wherein said cylindrical cam means is profiled to form first and second axially extending highpoints on said axially presented cylindrical ramp-like face disposed on diametrically opposite sides of said torque tube and which are interconnected by downwardly and upwardly sloped axially presented ramp-like cam surfaces to form said axially presented cylindrical ramp-like cam surface defined by a pair of diametrically opposed highpoints and a pair of intermediate diametrically opposed lowpoints; said cam follower means includes two cam rollers disposed on diametrically opposite sides of said torque tube in relatively movable engagement with said axially presented cylindrical ramp-like cam face; said pair of diametrically opposed cam rollers are engaged with said pair of diametrically opposed cylindrical cam highpoints when said movable structural member is in said first position; and, wherein said movable structural member moves upslope through an angle of rotation $\beta$ while said cam rollers move downslope relative to said cylindrical ramp-like cam surface as said movable structural member is rotated about said inclined hinge axis from said first position to said second position, and said movable structural member moves downslope through the angle of rotation $\beta$ while said cam rollers move upslope relative to said cylindrical ramp-like cam surface during movement of said movable structural member from said second position to said first position.

6. Apparatus as set forth in claim 5 wherein said cylindrical cam means and said cam follower means interact to compress said spring means as said movable structural member moves along a downslope path through said angle of rotation $\beta$ while said cam rollers relatively traverse the upslope portions of said cylindrical ramp-like cam surface so as to store energy in said spring means as said movable structural member moves from said second position to said first position so that when said movable structural member is manually rotated about said inclined hinge axis in an upslope direction through said angle of rotation β, said cam rollers traverse the downslope portions of said cylindrical ramp-like cam surface and said spring means expand in an axial direction to impart rotational torque to said torque tube through the particular one of said cylindrical cam means and said cam follower means which are nonrotatably mounted on said torque tube with freedom for axial movement therealong for minimizing the amount of manually applied torque required to move said movable structural member in an upslope direction about said inclined hinge axis from said first position to said second position.

7. Apparatus as set forth in claim 5 wherein said angle of rotation β is on the order of 123°.

8. Apparatus as set forth in claims 1 or 2 wherein said cylindrical cam means is profiled to form first and second axially extending highpoints on said axially presented cylindrical ramp-like face disposed on diametrically opposite sides of said torque tube and which are interconnected by downwardly and upwardly sloped axially presented ramp-like cam surfaces to define an axially presented cylindrical ramp-like cam surface having a pair of diametrically opposed highpoints and a pair of intermediate diametrically opposed lowpoints; said cam follower means includes two cam rollers disposed on diametrically opposite sides of said torque tube in relatively movable engagement with said axially presented cylindrical ramp-like cam face; said pair of diametrically opposite cam rollers are engaged with said pair of diametrically opposed cylindrical cam highpoints when said movable structural member is in said first position; and, wherein said movable structural member moves upslope through an angle of rotation β while said cam rollers move downslope relative to said cylindrical ramp-like cam surface during the initial portion of movement of said movable structural member about said inclined hinge axis from said first position towards said second position, said movable structural member moves downslope through an angle of rotation θ while said cam rollers move upslope relative to said cylindrical ramp-like cam surface during the latter portion of movement of said movable structural member about said inclined hinge axis from said first position towards said second position, said movable structural member moves upslope through said angle of rotation θ while said cam rollers move downslope relative to said cylindrical ramp-like cam surface as said movable structural member is rotated about said inclined hinge axis during the initial portion of movement thereof from said second position towards said first position, and said movable structural member moves downslope through said angle of rotation β while said cam rollers move upslope relative to said cylindrical ramp-like cam surface during the latter portion of movement of said movable structural member from said second position to said first position.

9. Apparatus as set forth in claim 8 wherein said cylindrical cam means and said cam follower means interact to compress said spring means as said movable structural member moves along a downslope path through said angles of rotation β and θ while said cam rollers relatively traverse the upslope portions of said cylindrical ramp-like cam surface so as to store energy in said spring means as said movable structural member moves along a downslope path towards each of said first and second positions so that when said movable structural member is manually rotated about said inclined hinge axis in an upslope direction through said angles of rotation β and θ, said cam rollers traverse the downslope portions of said cylindrical ramp-like cam surface and said spring means expands in an axial direction to impart rotational torque to said torque tube through the particular one of said cylindrical cam means and said cam follower means which are nonrotatably mounted on said torque tube with freedom for axial movement therealong for minimizing the amount of manually applied torque required to move said movable structural member in an upslope direction about said inclined hinge axis as said movable structural member moves from said first position to said second position and from said second position to said first position.

10. Apparatus as set forth in claim 8 wherein said angle of rotation β is on the order of 123° and said angle of rotation θ is on the order of 50°.

11. Apparatus as set forth in claims 1 or 2 wherein said acute angle α is on the order of 10°.

12. In combination with an aircraft door of the type adapted to be shifted outwardly and inwardly to open and close an ingress/egress opening in the aircraft fuselage during door opening and closing operations, respectively, about a generally vertical but inwardly canted hinge axis defined by a torque tube mounted in said fuselage with freedom for rotation about said axis and drivingly coupled to said door by hinge link defining means, and wherein said door is required to move upwardly during the initial portion of both door opening movement and door closing movement as a direct result of pivotal door movement about said generally vertical inwardly canted hinge axis, the improvement comprising a cam operated door counterbalance hinge assembly comprising:

(a) cylindrical cam means mounted concentrically about said torque tube and co-axial therewith, said cylindrical cam means defining an axially presented cylindrical ramp-like cam face;

(b) cam follower means mounted concentrically about said torque tube and co-axial therewith, said cam follower means including a plurality of cam rollers engaged with said cylindrical ramp-like cam face;

(c) one of said cylindrical cam means and said cam follower means being fixedly mounted on said fuselage;

(d) the other of said cylindrical cam means and said cam follower means being nonrotatably mounted on said torque tube with freedom for axial movement therealong;

(e) axially compressible and expandable spring means mounted concentrically about said torque tube and having one end thereof restrained from axial movement relative to said torque tube and the other end thereof bottomed on said other of said cylindrical cam means and said cam follower means for normally biasing said other of said cylindrical cam means and said cam follower means into engagement with said one of said cylindrical cam means and said cam follower means; and, (f) said cylindrical cam means being profiled so that said spring means is fully compressed axially when said door is both fully opened and fully closed and so that when said door is rotated from a fully closed and a fully opened position about said inwardly canted hinge axis, said spring means is permitted to expand axially as said door moves in an upslope direction and said torque tube rotates to cause said cam follower means to relatively traverse said ramp-like cam face whereby the other of said cylindrical cam means and said cam follower means imparts rotational torque to said torque tube as said spring means expands to thereby reduce the manual exertion required to rotate said door in an upslope direction about said canted hinge axis during a door closing and a door opening operation.

13. The combination as set forth in claim 11 wherein said cam follower means is fixedly mounted on said fuselage and said cylindrical cam means is nonrotatably mounted on said torque tube with freedom for axial movement relative thereto.

14. The combination as set forth in claims 12 or 13 wherein said aircraft door comprises a plug-type door.

15. The combination as set forth in claims 12 or 13 wherein said cam follower means includes two cam rollers disposed on diametrically opposite sides of said torque tube.

16. The combination as set forth in claims 12 or 13 wherein said cylindrical cam means is profiled to form first and second axially extending highpoints on said axially presented cylindrical ramp-like face disposed on diametrically opposite sides of said torque tube and which are interconnected by downwardly and upwardly sloped axially presented ramp-like cam surfaces to define an axially presented cylindrical ramp-like cam surface having a pair of diametrically opposed highpoints and a pair of intermediate diametrically opposed lowpoints; said cam follower means includes two cam rollers disposed on diametrically opposite sides of said torque tube in relatively movable engagement with said axially presented cylindrical ramp-like cam face; said pair of diametrically opposed cam rollers are engaged with said pair of diametrically opposed cylindrical cam highpoints when said door is fully closed; and, wherein said door moves upslope through an angle of rotation $\beta$ while said cam rollers move downslope relative to said cylindrical ramp-like cam surface as said door is rotated about said inwardly canted hinge axis from said fully closed position to an open position, and said door moves downslope through the angle of rotation $\beta$ while said cam rollers move upslope relative to said cylindrical ramp-like cam surface during movement of said door from said open position to said fully closed position.

17. The combination as set forth in claim 16 wherein said cylindrical cam means and said cam follower means interact to compress said spring means as said door member moves along a downslope path through said angle of rotation $\beta$ while said cam rollers relatively traverse the upslope portions of said cylindrical ramp-like cam surface so as to store energy in said spring means as said door moves from said open position to said fully closed position so that when said door is manually rotated about said inwardly canted hinge axis in an upslope direction through said angle of rotation $\beta$, said cam rollers traverse the downslope portions of said cylindrical ramp-like cam surface and said spring means expand in an axial direction to impart rotational torque to said torque tube through the particular one of said cylindrical cam means and said cam follower means which are nonrotatably mounted on said torque tube with freedom for axial movement therealong for minimizing the amount of manually applied torque required to move said door in an upslope direction about said inwardly canted inclined hinge axis from said fully closed position to said open position.

18. The combination as set forth in claim 17 wherein said angle of rotation $\beta$ is on the order of 123°.

19. The combination as set forth in claims 12 or 13 wherein said cylindrical cam means is profiled to form first and second axially extending highpoints on said axially presented cylindrical ramp-like face disposed on diametrically opposite sides of said torque tube and which are interconnected by downwardly and upwardly sloped axially presented ramp-like cam surfaces to define an axially presented cylindrical ramp-like cam surface having a pair of diametrically opposed highpoints and a pair of intermediate diametrically opposed lowpoints; said cam follower means includes two cam rollers disposed on diametrically opposite sides of said torque tube in relatively movable engagement with said axially presented cylindrical ramp like cam face; said pair of diametrically opposed cam rollers are engaged with said pair of diametrically opposed cylindrical cam highpoints when said door is in both a fully closed position and a fully opened position; and, wherein said door moves upslope through an angle of rotation $\beta$ while said cam rollers move downslope relative to said cylindrical ramp-like cam surface during the initial portion of movement of said door about said inwardly canted hinge axis from said fully closed position towards said fully opened position, said door moves downslope through an angle of rotation $\theta$ while said cam rollers move upslope relative to said cylindrical ramp-like cam surface during the latter portion of movement of said door about said inwardly canted hinge axis from a partially open position to said fully open position, said door member moves upslope through said angle of rotation $\theta$ while said cam rollers move downslope relative to said cylindrical ramp-like cam surface as said door is rotated about said inclined hinge axis during the initial portion of movement thereof from said fully open position towards said fully closed position, and said door moves downslope through said angle of rotation $\beta$ while said cam rollers move upslope relative to said cylindrical ramp-like cam surface during the latter portion of movement of said door from said fully open position to said fully closed position.

20. The combination as set forth in claim 19 wherein said cylindrical cam means and said cam follower means interact to compress said spring means as said door moves along a downslope path through said angles of rotation $\beta$ and $\theta$ while said cam rollers relatively traverse the upslope portions of said cylindrical ramp-like cam surface so as to store energy in said spring means as said door moves along a downslope path towards each of said fully closed and fully opened positions so that when said door is manually rotated about said inwardly canted hinge axis in an upslope direction through said angles of rotation $\beta$ and $\theta$, said cam rollers traverse the downslope portions of said cylindrical ramp-like cam surface and said spring means expand in an axial direction to impart rotational torque to said torque tube through the particular one of said cylindrical cam means and said cam follower means which are nonrotatably mounted on said torque tube with freedom for axial movement therealong for minimizing the amount of manually applied torque required to move said door in an upslope direction about said inwardly canted hinge axis as said door moves from said fully closed position to said fully opened position and from said fully opened position to said fully closed position.

21. The combination as set forth in claim 19 wherein said angle of rotation $\beta$ is on the order of 123° and said angle of rotation $\theta$ is on the order of 50°.

22. The combination as set forth in claims 12 or 13 wherein said inwardly canted hinge axis defines an acute included angle $\alpha$ with the vertical on the order of 10°.

* * * * *